United States Patent
Watt et al.

(10) Patent No.: US 8,224,666 B1
(45) Date of Patent: Jul. 17, 2012

(54) RULES BASED MEDICAL CHARGING SYSTEM

(75) Inventors: Dennis D. Watt, Alpharetta, GA (US); Bobby W. Roberts, Jr., Alpharetta, GA (US); Jonathan R. Hutton, Alpharetta, GA (US); Deanna L. Thompson, Alpharetta, GA (US)

(73) Assignee: Surgical Information Systems, LLC, Alpharetta, GA (US)

( * ) Notice: Subject to any disclaimer, the term of this patent is extended or adjusted under 35 U.S.C. 154(b) by 1100 days.

(21) Appl. No.: 12/148,489

(22) Filed: Apr. 18, 2008

Related U.S. Application Data

(63) Continuation of application No. 10/219,159, filed on Aug. 16, 2002, now abandoned.

(51) Int. Cl.
*G06Q 10/00* (2006.01)
*G06Q 50/00* (2006.01)
(52) U.S. Cl. ............ 705/2; 705/1; 705/3; 705/4; 705/34
(58) Field of Classification Search ................. 705/2–4, 705/1, 34; 235/375, 383; 283/68, 117
See application file for complete search history.

(56) References Cited

U.S. PATENT DOCUMENTS 5,956,690 A * 9/1999 Haggerson et al. ............... 705/3
5,991,728 A * 11/1999 DeBusk et al. .................... 705/2

* cited by examiner

*Primary Examiner* — Michelle Le
(74) *Attorney, Agent, or Firm* — Taylor English Duma LLP

(57) ABSTRACT

The combination of a data communication system, including data input, data retention, and data output means, and to the supporting software to develop an accurate account of charges for a surgical procedure, including pre-op, surgical and post-op, of a patient in a medical facility. The method consists of a pair of sequential and interrelated modular subsystems having an administrator module and a manager module. The method includes inputting of such information as base charges, modifying the inputted base charges based on known circumstances and unique conditions of the patient, and identifying materials and facility resources used in the surgical procedure. Further, the actual materials used in the surgical procedures are identified along with actual items and duration of use during the surgical procedure, for inputting into data input base, where all of this data and information is transmitted to the data retention and data output base for accurately determining the appropriate charges to the patient.

12 Claims, 2 Drawing Sheets

RULES BASED MEDICAL CHARGING SYSTEM

This application is a Continuation of Ser. No. 10/219,159 filed Aug. 16, 2002 now abandoned, under the same title and by the inventors hereof, where the contents thereof are incorporated herein by reference.

FIELD OF THE INVENTION

A This invention is directed to the field of setting up, maintaining and generating patient charges by medical personnel, more particularly to a rules based medical charging system for surgical procedures at a medical facility that consists of dual modules of administrating and managing.

BACKGROUND OF THE INVENTION

This invention teaches a system to enable a professional medical provider to set up and maintain billing rules and parameters used for patient charging for surgical procedures, and for generating patient charges in batch mode, where said charges may be reviewed and modified by personnel of the provider before being sent to the provider's billing system. It will be noted that the system of this invention is limited to billing charges for surgical procedures, including pre-op, the operating room procedures, i.e. operation, and post-op, and that ancillary charges related to a patient's stay at such facility, such as room, telephone, medication, and rehabilitation, are not included in this system.

Professional medical providers today seem to be spending an inordinate amount of time in generating paper work regarding patient charges before sending same to the patient and/or insurance provider. The time spent is nonproductive insofar as providing direct and needed services to a patient, and adds significantly to the overhead of the medical provider. There is the additional burden of being accurate and complete in defining the resources, i.e. procedures, materials, or other defined resources, that can be quantified for billing the patient and/or insurance provider.

In the age of third party payments, it is essential for billing purposes that the appropriate level of service be recorded for each patient-provider encounter. If the level of service recorded is higher than the level of service actually performed, the provider may be subject to liability for over charging. On the other hand, if the level of service recorded is lower than actually performed, the provider may not capture complete revenues for the service provided. Because the potential liability for over billing is so high, providers may routinely tend to record the level of an encounter lower than warranted by services actually delivered so as to forestall a charge of over billing. There is therefore a need for accurately determining and recording the appropriate level of encounter when a provider renders services. In addition to assigning accurately a level of service, and the resources used in providing such service, it is also important for a provider to record accurately and promptly procedures performed on a patient and the diagnosis or diagnoses which prompted the patient encounter.

In an effort to provide a complete, accurate and fair accounting of patient charges for medical procedures, the prior art has developed several systems to ensure such procedures are accurately reported and reflected in the charges sent to the medical provider. Examples of such prior art systems are described in the following U.S. Patents:

a.) U.S. Pat. No. 5,970,463, to Cave et al., relates to a medical claims integration and data analysis system that categorizes medical claims into episodes of care having predetermined diagnostic cluster types. The system analyzes medical claim items, some of which have principal diagnosis codes, and some of which have non-principal, missing, or incorrect diagnosis codes. Patient treatment episodes (PTEs) are formed from the principal diagnosis codes, each PTE being of a particular diagnostic cluster type. The system categorizes non-principal-diagnosis claim items into the PTEs on the basis of temporal, physiological or clinical relationships between the claim items and the PTEs. A drug lookup table enables drug claims to be properly categorized in the PTEs. A diagnostic cluster lookup table enables claim items to be categorized into PTEs with ongoing treatment windows for which the diagnosis code of the claim item is in the diagnostic cluster lookup table. The system merges PTEs of the same diagnostic cluster type when the treatment windows of the PTEs overlap. The system attempts to recategorize medical claims into merged PTEs. The system analyzes each PTE to determine the presence of required diagnosis and eliminates any PTE without a required diagnosis. The system also identifies and merges PTEs that are clinically related or clinically similar. In a system for integrating medical claims data, medical claim items that are in different data formats and/or use different coding systems are analyzed, and related claim items are categorized in a common coding system.

b.) U.S. Pat. No. 5,933,809, to Hunt et al., teaches a computer software system for processing medical billing record information that is capable of being executed by a conventional computer microprocessor to perform information processing on pre-existing medical billing record information, preferably consisting of hospital or individual doctor Medicare billing records. The software contains at least one set of instructions for receiving, converting, sorting and storing input information from the pre-existing medical billing records into a form suitable for processing. The software contains at least one set of instructions for processing the input medical billing record information, preferably to identify potential Medicare "72 hour billing rule" violations. This processing is preferably performed by comparing each input medical billing record containing dates of medical inpatient admission and discharge to each input medical billing record containing a date of medical outpatient service. The inpatient and outpatient billing records are first compared to determine if they contain matching patient identification codes to identify all the record originating from the same patient. If matching patient identification codes are found, the inpatient and outpatient billing records are further compared to determine if the date of outpatient service fell within a preselected time period, preferably 72 hours, prior to the date of inpatient admission. If so, the matching inpatient and outpatient billing records are distinguished and stored separately for further processing. If not, the matching inpatient and outpatient billing records are compared to determine if the date of outpatient service fell between the inpatient admission and discharge dates. If this is the case, the matching inpatient and outpatient billing records are again distinguished and stored separately for further processing. If not, the program proceeds to the next set of billing records to repeat the sequence.

c.) U.S. Pat. No. 5,229,584, to Erickson, is directed to a medical billing system that includes bar code reading apparatus which communicates with a hand held computer. The computer includes an encounter, diagnosis and procedure data base stored in memory. Bar coded procedure and diagnosis information readable by the bar code reader is provided. The computer is programmed to determine a level of service from the encounter information selected by the healthcare provider. The system provides an accurate way of assessing the appropriate level of encounter and it provides a compact, rapid method of collecting all data necessary to generate an accurate bill resulting from an encounter between a patient and a healthcare provider.

While the prior art, as exemplified in the above U.S. Patents present a billing system for use by medical facilities, none offer the support and need in providing an effective and accurate system for billing charges for surgical procedures in the manner of the present invention. The manner by which this invention achieves the desired goals hereof will become more apparent in the description which follows, particularly when read in conjunction with the accompanying schematic flow diagrams.

SUMMARY OF THE INVENTION

This invention relates to the combination of a data communication system, including data input, data retention, and data output means, and to the software supported developing an accurate account of patient charges for a surgical procedure of a patient in a medical facility. The system hereof is limited to surgical procedures performed at a medical facility, where the procedures include pre-op, surgical and post-op surgical activity. The method consisting of a pair of sequential modular subsystems having an administrator module and a manager module, comprises the steps of establishing a series of base charges for the surgical procedure, for inputting into said data input means, where the series of base charges are based on experience and medical provider requirements for said surgical procedure. Further, by way of example, the base charges include the type of patient admission, type of physician performing the surgical procedure, and projected time for the procedure. The method continues by modifying the inputted base charges based on known circumstances and unique conditions of the patient, and identifying materials and facility resources used in the surgical procedure, for inputting into the data input means. From this, a billing matrix, associated with the materials, is developed. Finally, the actual materials used in the surgical procedures are identified along with actual items and duration of use during the surgical procedure, for inputting into the data input means. Charges based on data from the above steps are electronically transferred to the data retention and data output means.

Accordingly, a feature of this invention is the provision of an accurate, fair and efficient rules based medical billing system for surgical procedures.

Another feature of the present invention is a rules base medical billing systems that includes two sequentially practiced subsystems in the form of an administrator module and a manager module.

Still a further feature hereof is the provision of a rules based medical billing system limited to surgical procedures, including pre-op, operating room activities, and post-op recovery.

These and other features of the invention will become more apparent from the specification which follows, especially in association with the accompanying Figures.

DETAILED DESCRIPTION OF THE PREFERRED EMBODIMENT

This invention is directed to a rules based medical charging system for surgical procedures at a medical facility, such as a hospital, where the system hereof comprises a pair of sequentially practiced modules of administrating and managing. The system, which provides an accurate account of charges for the surgical procedure, will now be described with regard to the two Figures.

Figure 1:
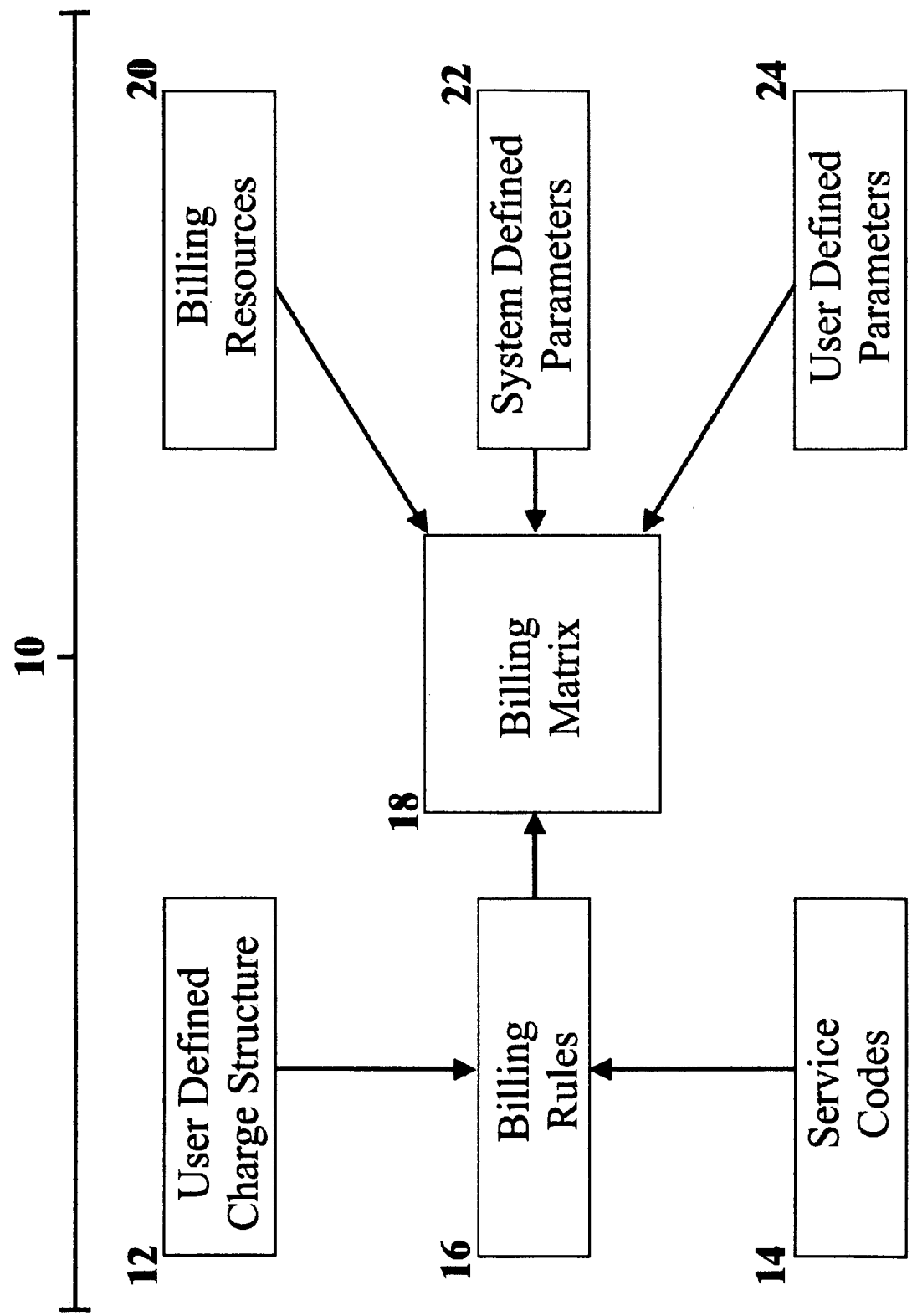
FIG. 1 is a flow chart of inputted data processing information for a first modular subsystem used to implement the surgical billing system according to the present invention.

Turning now to the two Figures, which Figures are modular subsystems 10, 10' of the rules based medical billing system of this invention, and practiced in sequential order, FIG. 1 is a flow chart of inputted information to be defined in a billing rules matrix. The subsystem 10 is intended to enable personnel of the medical facility performing the surgical procedure to set up and maintain billing rules and parameters used for patient charging within the medical facility.

The respective subsystems illustrated in the Figures are driven by a data communication system, that may include, but not limited to, as known in the art, data input means, data retention means, computer-readable data storage mediums, and data output means. The storage mediums may take a variety of forms, such as a stand alone device, i.e. personal computer (PC), magnetic storage hard disk drives, magnetic portable floppy disks and optical storage compact disks, or even networked through a LAN system.

Returning now to FIG. 1, there is illustrated a block diagram showing information and data flow from a user defined charge structure 12 and service codes 14 to a billings rule 16, composed of service codes 14 and user defined charge structures 12, thence to a billing matrix 18. Additionally, information and data flow from three further sources, billing resources 20, system defined parameters 22, and user defined parameters 24, all of which are also transmitted to the billing matrix 18, where the accumulated and assimilated information and data from the billing matrix 18 becomes a source for the flow of information and data in the subsystem of FIG. 2. Continuing with the various information and data sources:

a.) User defined charge structure 12—information and data of facility fixed charges, based on known reimbursement charges by insurance providers, i.e. Medicare and/or private medical insurance companies, type of admission, type of physician, such as an Orthopedic surgeon performing a hip or total knee replacement, facility equipment to be used, type of anesthesia, operation room duration, including set-up. That is, once the user has the service codes 14, discussed below, in the system 10, the user creates/adds a new billing rule 16, see below, by creating a unique rule name. Thereafter, the user selects a service code 14 and corresponding description in the system 10. For this selected service code 14, the user selects the user defined components for this line item, i.e. starting unit time value (typically zero), ending unit time value (typically a large value like 9999), increment (typically 1, 5, 12, 15, 24, 30, 60, or flat fee), increment units (typically seconds, minutes, hours), and charge (a monetary price, usually expressed in dollars, including $0.00). Finally, the user can then click OK to finish the billing rule or can continue to build the billing rule 16 by at the initial step above. The addition of other line items to this billing rule may also be considered to be a part of the user defined charge structure 12;

b.) Service codes 14—information and data of the fixed accounting and administrative charges associated with setting up the surgical procedure, including pre-op, surgery, and post-op activities, where the service codes are actually composed of two items: service codes and descriptions. The service code component is a numeric or alphanumeric value. The description corresponds to the service code. Typical descriptions could relate to room charges, anesthesia charges material usages. For example, typical charges may cover room charges service codes, i.e. "ABC123" 'recovery room first hour', "ABC124" 'recovery room minimal fee', "ABC 125" 'recovery room add outpatient 30 minutes', and "ABC126" 'recovery room add inpatient 30 minutes';

c.) Billing rules 16—information and data assimilated from the Service codes 14 and user defined charge structure 12, for transmission directly to the Billing matrix 18;

d.) Billing matrix 18—information and data received from billing rules 16, billing resources 20, system defined parameters 22 and user defined parameters 24, setting the rules for all defined charges and subsequent billing charges, see again FIG. 1. The billing matrix 18 is essentially a filter that is used to sift through case information, compares the case information against the resource name's start and ending modules, and time notations, compares the case information against system and user defined criteria, i.e. parameters, and then applies to the case one or more billing rules associated with the matrix (for the times frame outlined by the resource name conditions) if all parameters are met. As will be apparent from FIG. 2, and discussed later, the billing matrix represents one source of data and information to be transmitted under the system 10' of FIG. 2;

e.) Billing resources 20—information and data of anticipated actual surgical procedures resources, where the billing resources may be revenue categories such as anesthesia revenue, PACU revenue, procedure revenue, room revenue, and materials, by way of example. Billing resources 20 are given a specific name, then each resource is assigned a module name start, for instance the SIS nursing intraop module, start time notation, i.e. OR time, a module end name, where this may be either the same module as the start module or a different module such as the SIS PACU module, and an end time module such as anesthesia end time;

f.) System defined parameters 22—these may include such parameters as admission type, service, payer, whether third party insurance, worker's compensation, or cash directly from patient, facility, OR room, anesthesia type, and procedure. Facility users may select the applicable specific information that pertains to each of these case information categories. For example: admission type—inpatient; service—orthopedic; payer—commercial insurance; facility—Memorial Hospital; OR room—OR 12; anesthesia type—general; procedure—mastectomy; and, g.) User defined parameters 24—data and information related to the unique circumstances of the patient, such as impairments or special needs. These are additional parameters that may be added to the system 10 matrix. Any case information category that is associated with the system may be selected and incorporated into the rules matrix. Any case information category can be associated here, such as case class, transport to, impairments, and confidentiality.

Figure 2:
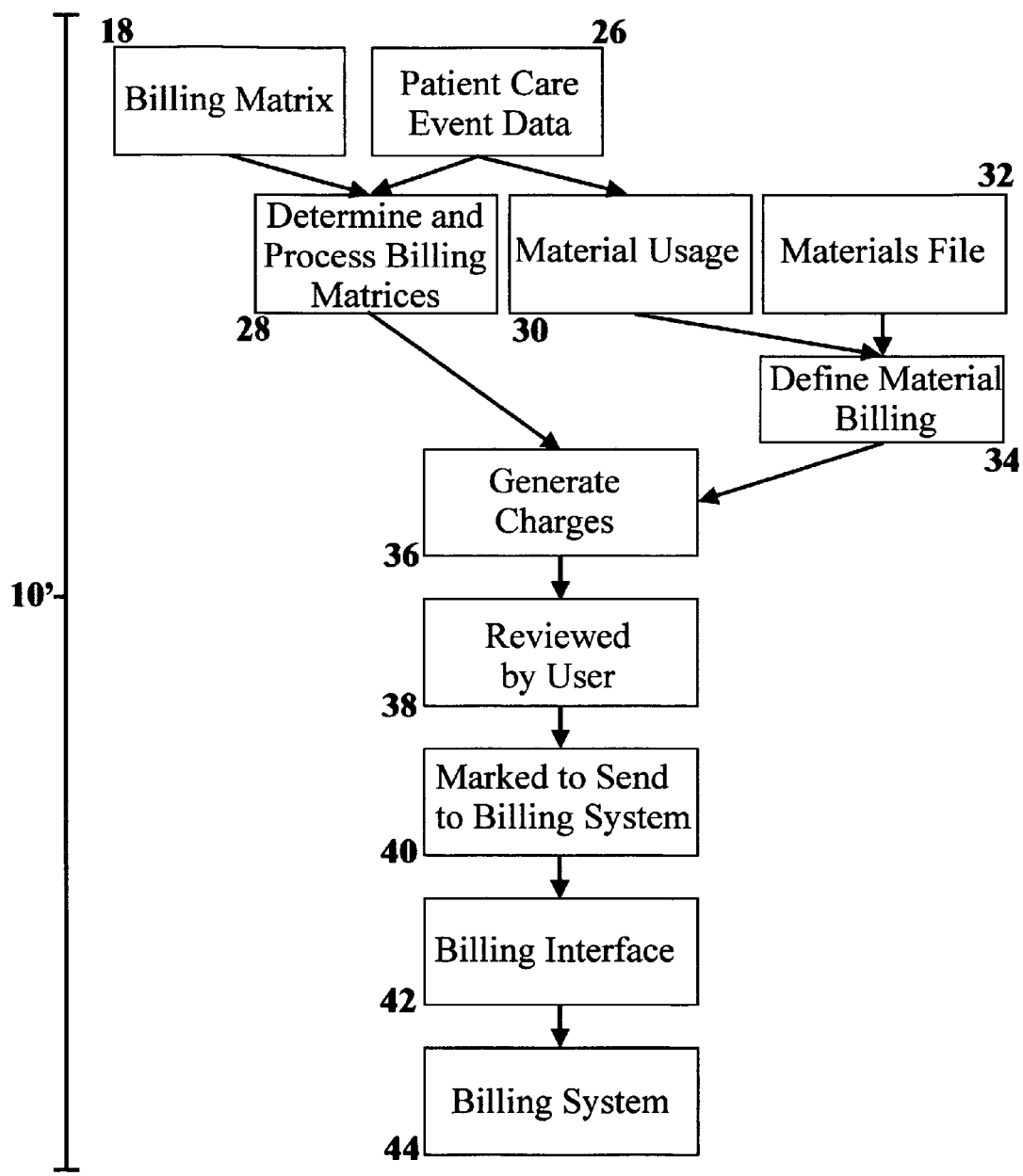
FIG. 2 is a flow chart of a second modular subsystem of the invention, where the respective subsystems are practiced sequentially for the full system hereof.

Turning now to FIG. 2, which completes the total system of this invention, the subsystem 10' comprises information and data relating to actual materials used in the surgical procedure, duration times, etc. Inputted information and data includes items from the billing matrix 18, patient care event data 26, both of which are transmitted in full or in part to the determine and process billing matrices 28, where a portion of the information and data from the patient care event data is transmitted to material usage 30. Additional information and data is inputted into a materials file 32, thence to a define material billing 34, which is also receiving information and data from the material usage 30. The subsystem 10' concludes with the generate charges 36, receiving information and data from the determine and process billing matrices 28 and define material billing 34. Thereafter, the assimilated information and data from generate charges 36 is transmitted directly to a series of stations, namely, reviewed by user 38, marked to send to billing system 40, then through a billing interface 42, and finally to a billing system 44.

Continuing with the various information and data producing stations and sources for the subsystem 10', where this subsystem generates patient charges in batch mode, including but not limited to the billing matrix 18:

a.) Patient care event data 26—information and data relating to all materials used during the surgical procedure. This component, a critical element to the system hereof, for it is all the care event data for the patient and contains information, such as, but not limited to, procedure type; case surgeon and all facility personnel assigned to the case; procedure information; OR information—such as room number and usage; special needs of the patient; level of care information; and, insurance type. All this information is needed as raw material for the rules matrix—this information flags parameters and billing resource time frames so a rules matrix product can be calculated;

b.) Determine and Process billing matrices 28—This is the billing information output of the case that was filtered through the billing matrix 18 discussed above. This is the product of what the rules matrix calculates after applying the billing rules as governed by the system and user parameters and time frame associated by the billing resources 20 in the rules matrix;

c.) Material usage 30—information and data relating to actual set-up time for the surgical procedure. This is information and data relating to the quantity or time materials were used during the surgical procedure. The "materials" can actually include materials, supplies, and equipment used during the case. Every piece of "material" should be accounted for and quantified somehow during the case, whether it was a known quantity of sponges, time of laser use, or the presence of an equipment cart during the procedure, or it may be charged as a flat fee;

d.) Materials file 32—information and data relating to the basis for charging per unit items and duration of time, such as laser usage, for example. This component can be defined as information and data relating to all materials used during the surgical procedure, i.e. all types, units and packaging, costs per unit, and any special material usage information;

e.) Define material billing 34—the materials usage information, combined with the case materials and processed together to produce the total material billing information for the case;

f.) Generate charges 36—The products of two calculations are combined to form the case charges. When a user clicks the generate button and enters data to select a case for which to generate charges, all case charges are combined and calculated for the case and display in the system hereof;

g.) Reviewed by user 38—This component enables facility personnel to review and edit charges. More precisely, the facility user can, before of after generating charges, whether a credit or debit, edit or add charges for a case, i.e. adding or editing service codes and descriptions, quantity, total charge, and marking a charge line item as credit or debit. The user can also remove charge line items from a case during the charge review. After generating the charges, the user can also review any errors that may appear for the case charges. Further, the user can choose to override errors or mark them to send them to the billing system at this time;

h.) Marked to send to billing system 40—This component permits the user to send the reviewed, corrected and edited billing charges to the billing interface 42;

i.) Billing interface 42—this component collects the generated and reviewed charges, and formats the charge information into a scheme that can be imported into an external billing system; and, j.) Billing system 44—generation of the patient care event charges for the surgical procedure, but further allows the inclusion of other charges associated with the total care event, even if the charges come from outside the facility, such as room charges, medication and rehabilitation, by way of example.

It is recognized that changes, variations and modifications may be made to the rules base charging system of this invention, particularly by those skilled in the art, without departing from the spirit and scope thereof. Accordingly, no limitation should be imposed thereon except as set forth in the accompanying claims.

We claim:

1. A method for developing an accurate account of charges for a surgical procedure of a patient in a medical facility, where said patient charges are sent to an insurance provider, said method operating with a computer based system that includes data input means, data retention means, and data output means, said method consisting of the steps of
   a.) establishing a series of base charges for said surgical procedure for inputting into said data input means, where said series of base charges are based on cost and medical provider requirements for said surgical procedure, said base charges including the type of patient admission, type of physician performing said surgical procedure, and projected time for said procedure;
   b.) modifying said inputted base charges based on circumstances and conditions of said patient;
   c.) identifying materials and facility resources used in said surgical procedure for inputting into said data input means;
   d.) determining by a computer, a charging matrix associated with said materials and said facility resources, wherein said charging matrix functions as a filter to sift through said procedure information, and compares said information against the start and end names of the data input means resource, then applies same to said procedure one or more billing rules associated with said charging matrix;
   e.) identifying actual material used in said surgical procedure, and actual items and duration of use during said surgical procedure for inputting into said system;
   f.) generating, by a computer, the charges based on data from steps a.) through f.); and,
   g.) electronically transferring said charges to said data retention and data output means.

2. The method according to claim 1 wherein said charging matrix is the focus and terminus of data and information from said administrator module, and a first source of data and information transmitted into and through said manager module.

3. The method according to claim 2, wherein the step of identifying actual material used is a second source of data and information for said manager module and includes all the care event data for said patient.

4. The method according to claim 2, wherein said determination of said charging matrix is based in part on information and data of anticipated actual surgical procedure resources, data and information on the parameters of the patient's admission type, service and payer, and data and information relating to unique circumstances of said patient.

5. The method according to claim 1, wherein said generation of charges is based on the combination of two calculations of material used in said procedure, and data and information filtered through said charging matrix.

6. The method according to claim 5, including the step, within said generation of charges, of transmitting data and information to a billing interface to format said data and information into a scheme that can be imported into an external billing system of said facility.

7. A method for developing an accurate account of charges for a patient for a surgical procedure of said patient in a medical facility, where said method includes a pair of sub-methods identified as an administrator module and a manager module that comprise a series of steps:
   a) establishing a series of base charges for said surgical procedure for inputting into said system, where said series of base charges are based on cost and medical provider requirements for said surgical procedure, said base charges including the type of patient admission, type of physician performing said surgical procedure, and projected time for said procedure;
   b.) modifying said inputted base charges based on circumstances and conditions of said patient;
   c.) identifying materials and facility resources used in said surgical procedure for inputting into said system;
   d.) determining by a computer, a charging matrix associated with said materials and said facility resources, wherein said charging matrix functions as a filter to sift through said procedure information, and compares said information against the start and end names of the data input means resource, then applies same to said procedure one or more billing rules associated with said charging matrix;
   e.) identifying actual material used in said surgical procedure, and actual items and duration of use during said surgical procedure for inputting into said system; and,
   f.) generating, by a computer, the patient charges based on data from steps a.) through e.).

8. The method according to claim 7, wherein said charging matrix is the focus and terminus of data and information from said administrator module, and a source of data and information transmitted into and though said manager module.

9. The method according to claim 8, wherein the step of identifying actual material used is a second source of data and information for said manager module and includes all the care event data for said patient.

10. The method according to claim 8, wherein said determination of said charging matrix is based in part on information and data of anticipated actual surgical procedure resources, data and information on the parameters of the patient's admission type, service and payer, and data and information relating to unique circumstances of said patient.

11. The method according to claim 7, wherein said generation of charges is based on the combination of two calculations of material used in said procedure, and data and information filtered through said charging matrix.

12. The method according to claim 11, including the step, within said generation of charges, of transmitting data and information to a billing interface to format said data and information into a scheme that can be imported into an external billing system of said facility.

\* \* \* \* \*